United States Patent
Wu

(10) Patent No.: US 12,320,444 B2
(45) Date of Patent: Jun. 3, 2025

(54) WARNING DEVICE FOR VALVE MAINTENANCE

(71) Applicants: MICROPROGRAM INFORMATION CO., LTD., Taichung (TW); TRANSWORLD STEEL ENTERPRISE CO., LTD., Taichung (TW)

(72) Inventor: Teng Yen Wu, Taichung (TW)

(73) Assignees: MICROPROGRAM INFORMATION CO., LTD., Taichung (TW); TRANSWORLD STEEL ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 18/657,096

(22) Filed: May 7, 2024

(65) Prior Publication Data

US 2024/0377000 A1  Nov. 14, 2024

(30) Foreign Application Priority Data

May 10, 2023  (TW) ................................. 112117402

(51) Int. Cl.
*F16K 37/00*  (2006.01)
*G01L 3/10*  (2006.01)
(Continued)

(52) U.S. Cl.
CPC ...... *F16K 37/0033* (2013.01); *F16K 37/0025* (2013.01); *F16K 37/005* (2013.01);
(Continued)

(58) Field of Classification Search
CPC ............. F16K 37/0083; F16K 37/0041; F16K 37/0091; F16K 37/0075; F16K 37/0025;
(Continued)

(56) References Cited

U.S. PATENT DOCUMENTS 593,104 A     11/1897  King
8,314,610 B2 *  11/2012  Urano ................. G01D 5/2013
                                                324/207.25
(Continued)

FOREIGN PATENT DOCUMENTS

DE       2016106181 A1   10/2017
DE      102019122525 A1    2/2021
(Continued)

*Primary Examiner* — Atif H Chaudry
(74) *Attorney, Agent, or Firm* — Sinorica International Patent & Trademark

(57) ABSTRACT

A warning device is mounted on a valve including a valve body, a valve seat and a valve stem. The warning device comprises a base, a shaft, a sensing module, a control module and a warning module. The base is connected to the valve body. The shaft has a shaft body and a first sensing member. A profile of a cross section of the shaft being passed through by the first sensing member is asymmetric along at least a radial direction. The sensing module has a second sensing member received in the base and corresponded to the first sensing member to detect changes in position of the first sensing member and generate a sensing signal accordingly. The control module receives the sensing signal generated by the sensing module and calculates a rotation data accordingly. The warning module generates a warning signal according to the rotation data from the control module.

9 Claims, 8 Drawing Sheets

(51) Int. Cl.
*G01L 3/14* (2006.01)
*G01L 5/00* (2006.01)

(52) U.S. Cl.
CPC ...... *F16K 37/0075* (2013.01); *F16K 37/0083* (2013.01); *F16K 37/0091* (2013.01); *G01L 3/10* (2013.01); *G01L 3/1457* (2013.01); *G01L 5/0028* (2013.01); *G01L 5/0061* (2013.01)

(58) Field of Classification Search
CPC . F16K 37/0033; F16K 37/005; G01L 5/0061; G01L 5/0028; G01L 3/108; G01L 3/10; G01L 3/1457
See application file for complete search history.

(56) References Cited

U.S. PATENT DOCUMENTS

| | | | |
|---|---|---|---|
| 2001/0002599 | A1 | 6/2001 | Apel et al. |
| 2008/0087858 | A1 | 4/2008 | Hatsuzawa et al. |
| 2013/0319551 | A1* | 12/2013 | Dohi .................. F16K 37/0083 137/551 |
| 2019/0353271 | A1* | 11/2019 | Uehara .................. F16K 31/08 |

FOREIGN PATENT DOCUMENTS

| | | |
|---|---|---|
| DE | 202022104260 U1 | 10/2022 |
| JP | 2008039126 A | 2/2008 |
| JP | 2012197938 A | 10/2012 |
| JP | 2017211063 A | 11/2017 |
| KR | 102392203 B1 | 4/2022 |
| TW | 202007892 A | 2/2020 |
| WO | WO2014122810 A1 | 8/2014 |
| WO | WO2021123445 A1 | 6/2021 |

* cited by examiner

WARNING DEVICE FOR VALVE MAINTENANCE

BACKGROUND OF THE INVENTION

1. Technical Field

The present invention relates to a valve, and more particularly to an warning device for valve maintenance for automatically detecting the status of the valve and providing warning signal for the maintenance if able.

2. Description of Related Art

Valves are commonly used regulating mechanisms in fluid transportation systems, typically employed to control the opening, flow rate, and/or direction of fluid in pipelines. The ball valve is one of the most common types of valves, designed as an improved structure from the traditional plug valve, utilizing a sphere to replace the previous cylindrical body. Generally, a ball valve comprises a valve body, a valve seat, and a valve stem. The valve body is connected between pipeline sections, with an internal fluid passage. The valve seat, shaped like a sphere, is located within the fluid passage of the valve body, with a through-hole corresponding to the fluid passage. An end of the valve stem is connected to the valve seat, while the other end typically features a control lever, allowing a user to operate the lever to control the rotation of the valve stem, thereby further rotating the valve seat. As the through-hole of the valve seat switches between being connected and disconnected to the fluid passage with the rotation of the valve seat, it controls the opening and closing of the flow path. The advantages of a ball valve include high sealing performance, relatively low resistance in the straight-through flow path, and adjustable diameter to meet various requirements, making it widely applicable.

However, like other mechanical components, valves experience wear and tear on each rotation, which may damage various parts over long-term use. Consequently, issues such as difficulty in rotating the valve stem, the valve seat failing to rotate with the valve stem, or inability to prevent fluid flow through the valve, and incomplete sealing at the valve port may arise. Therefore, to avoid such problems, the simplest method is to record the frequency of rotations of the ball valve, allowing prediction of its current usage status and determining if the maintenance is required. Currently, manual recording is commonly employed, but it suffers from low efficiency and high labor costs. Consequently, maintenance or replacement of valves typically occurs only when problems arise, resulting in increased maintenance costs. This issue is not unique to ball valves; other types of valves may encounter similar problems. Therefore, automatic detection of valve usage status and warning maintenance personnel after a predetermined number of rotations is one of the urgent issues to be addressed by relevant industries and manufacturers.

BRIEF SUMMARY OF THE INVENTION

In view of the above, the primary objective of the present invention is to provide a warning device for valve maintenance to automatically detect the frequency of rotation of the valve and additionally predict the status of use of the valve.

In order to achieve the objective of the present invention, a warning device, mounted on a valve which including a valve body, a valve seat and a valve stem; the warning device comprising: a base connected to the valve body; a shaft having a shaft body and a first sensing member; the shaft body movably received in the base with an end connected to the valve stem to drive the valve stem to rotate; wherein a profile of a cross-section of the shaft being passed through by the first sensing member is asymmetric along at least a radial direction; a sensing module having a second sensing member received in the base and corresponded to the first sensing member to detect changes in position of the first sensing member and generate a sensing signal accordingly; a control module, received in the base and electrically connected to the sensing module, having a receiving unit and a processing unit; the receiving unit receiving the sensing signal generated by the sensing module; the processing unit calculating a rotation data based on the sensing signal; and a warning module received in the base and signal connected to the control module to generate a warning signal according to the rotation data from the processing unit.

In an embodiment, the first sensing member includes a sensing circuit board and a metal layer; the sensing circuit board surrounds the shaft body, and the metal layer is mounted on the sensing circuit board covering at least a portion of the sensing circuit board; the second sensing member includes an inductive position sensor surrounding the shaft body and kept a predetermined distance to the metal layer.

In an embodiment, the cross-section the shaft being passed through by the first sensing member can be separated as two parts through the radial direction, and areas of the metal layer in each parts are different.

In an embodiment, the base has a first storage space and a first opening communicated with each other; the first sensing member and the second sensing member are received in the first storage space, and an end of the second sensing member extends out of the first storage space and electrically connected to the control module.

In an embodiment, the sensing module further includes a torque sensor mounted on the shaft body and electrically connected to the control module to detect changes in resistance as the shaft body rotates and generate a resistance value signal accordingly; the control module calculates a torque data based on the resistance value signal generated by the torque sensor.

In an embodiment, the shaft body includes a torque sensing surface on its outer periphery; the torque sensor is attached to the torque sensing surface and is tilted at a predetermined angle relative to an axial direction of the shaft body.

In an embodiment, the base includes a second storage space and a second opening; the second storage space is connected to a stem packing of the valve body so that the valve stem extends into the second storage space through the stem packing; the sensing module further includes a pressure sensor electrically connected to the control module and extends into the second storage space through the second opening to detect changes in pressure of the second storage space and generate a pressure value signal accordingly; the control module calculates a pressure data based on the pressure value signal generated by the pressure sensor.

In an embodiment, the base includes a seat body and a case surrounding the seat body, and a third storage space is formed between the seat body and the case; the warning module includes a LED circuit board and a LED unit; the LED circuit board is received in the third storage space of the base and signal connected to the control module; the LED unit is mounted on an outer surface of the case and electrically connected to the LED circuit board to generate a warning light base on the control from the control module.

In an embodiment, the shaft body has a ring-shaped metal outer surface; the first sensing member includes a surface integrally formed on the outer surface of the shaft body and extending inward along the radial direction of the shaft body; the second sensing member includes an inductive position sensor corresponded to the first sensing member, surrounding the shaft body and kept a predetermined distance from the shaft body; at least a distance between the first sensing member and the second sensing member is greater than a distance between the outer surface of the shaft body and the second sensing member.

In an embodiment, the shaft body has a ring-shaped metal outer surface; the first sensing member includes a surface integrally formed on the outer surface of the shaft body and extending outward along the radial direction of the shaft body; the second sensing member includes an inductive position sensor corresponded to the first sensing member, surrounding the shaft body and kept a predetermined distance from the shaft body; at least a distance between the first sensing member and the second sensing member is less than a distance between the outer surface of the shaft body and the second sensing member.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
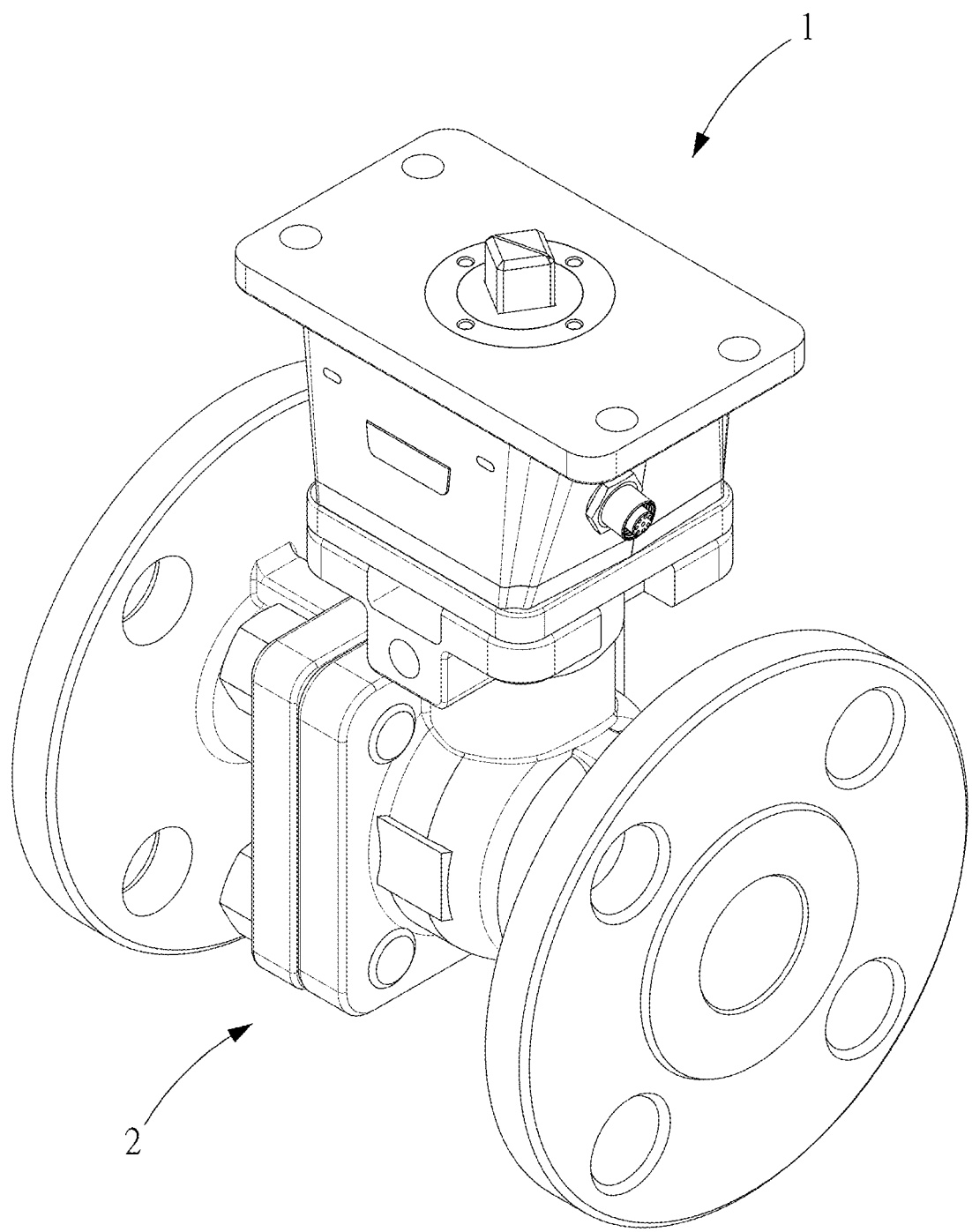
FIG. 1 is a perspective view of a first preferred embodiment of the present invention.
Figure 2:
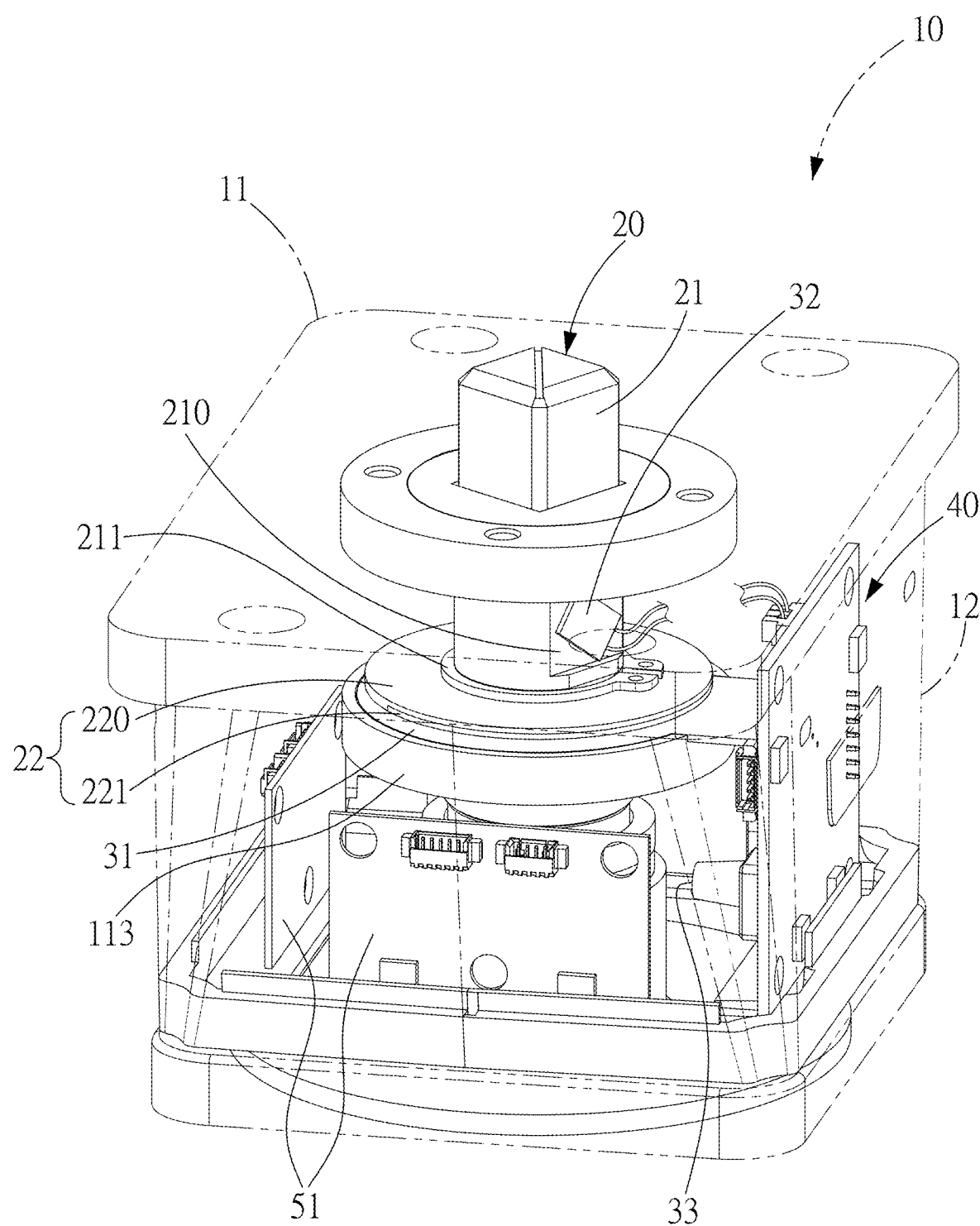
FIG. 2 is another perspective view of the first preferred embodiment of the present invention.
Figure 3:
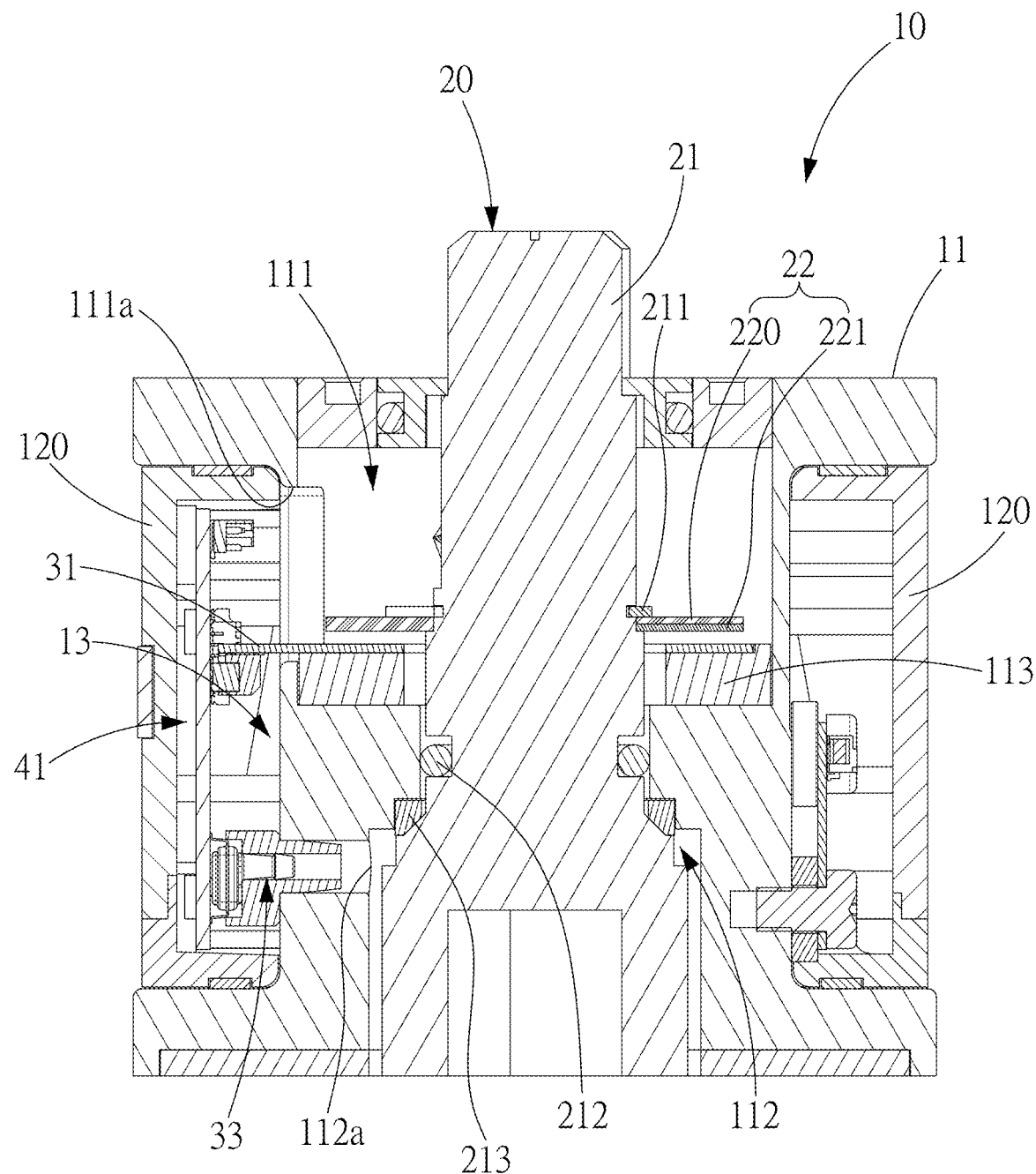
FIG. 3 is a portrait sectional view of the first preferred embodiment of the present invention.

As shown in FIG. 1 to FIG. 5, a warning device 1 of a first preferred embodiment of the present invention provides installed on a valve 2. In this embodiment, the valve 2 is a ball valve structure, comprising a valve body, a valve seat, and a valve stem. The valve body has an internal fluid passage, with openings on both sides of the valve body connected to the fluid passage for connection to pipes. The valve seat is spherical and received the fluid passage of the valve body, with a through-hole corresponded to a flow direction of the fluid passage. The valve stem is movably arranged in the valve body, with an end connected to the valve seat and another end extending out of the valve body along a stem packing of the valve body to drive the valve seat to rotate for controlling opening and closing of the fluid passage. The aforementioned structure is similar to conventional valve structures. In an alternative preferred embodiment, the valve may be a ball valve, a gate valve, a butterfly valve, or any other types of valves. The features of the present invention are as follows:

In the present preferred embodiment, the warning device 1 comprises a base 10, a shaft 20, a sensing module 30, a control module 40 and a warning module 50.

The base 10 comprises a seat body 11 and a case 12. The seat body 11 is a hollow component in an H-shaped configuration, with an end detachably fixed to the valve body. The seat body 11 has longitudinally interconnected first storage space 111 and a second storage space 112, wherein the second storage space 112 is communicated with the stem packing of the valve body for the valve stem to extend into the base 10. The seat body 11 also has first opening 111*a* and second opening 112*a*. The first opening 111*a* is communicated with the first storage space 111, and the second opening 112*a* is communicated with the second storage space 112. In the present preferred embodiment, the case 12 is a box-shaped component formed by combining two case pieces 120, surrounding the seat body 11 and enclosing the seat body 11. Additionally, the base 10 further comprises a third storage space 13 between the seat body 11 and the case 12.

Figure 4:
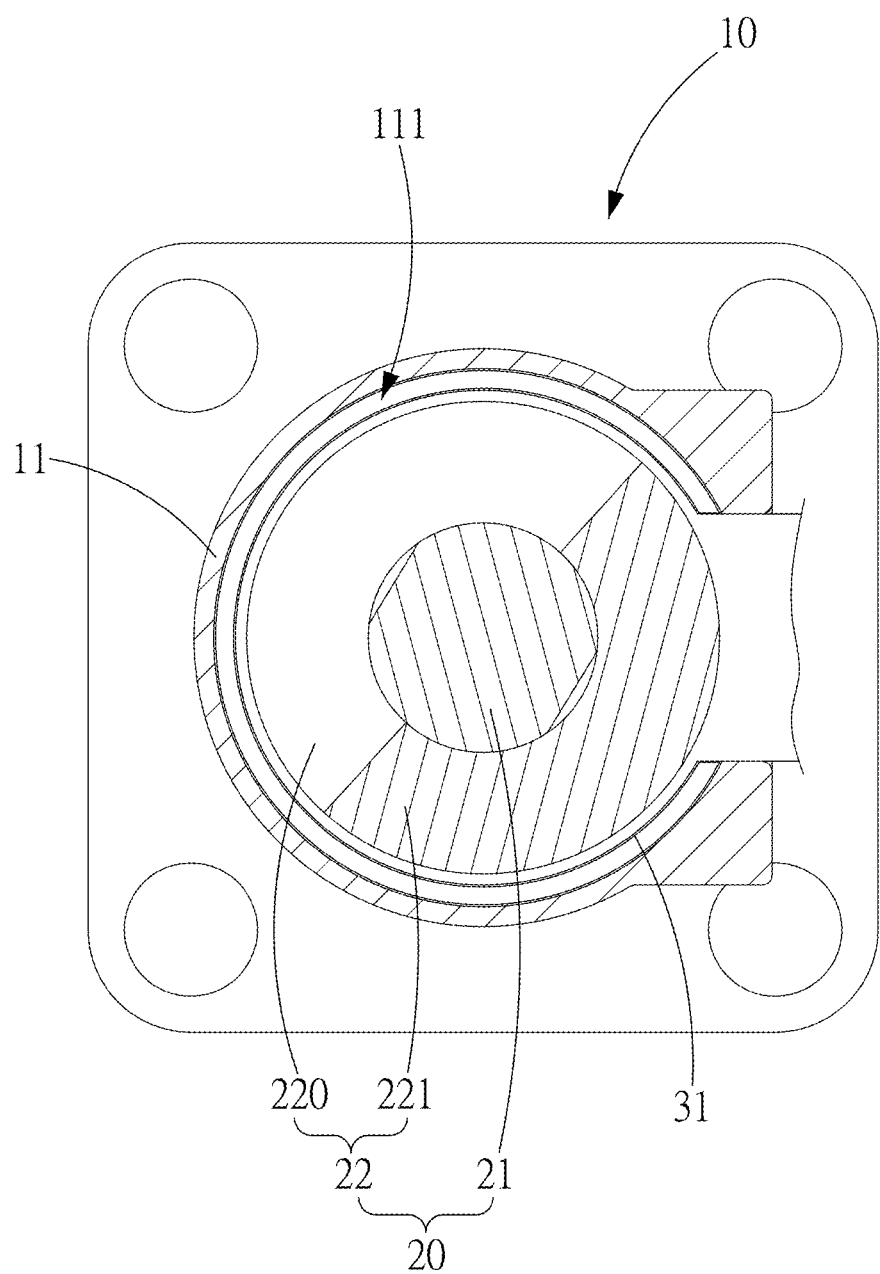
FIG. 4 is a lateral sectional view of the first preferred embodiment of the present invention, showing the profile of the cross-section of the shaft being passed through by the first sensing member.
Figure 5:
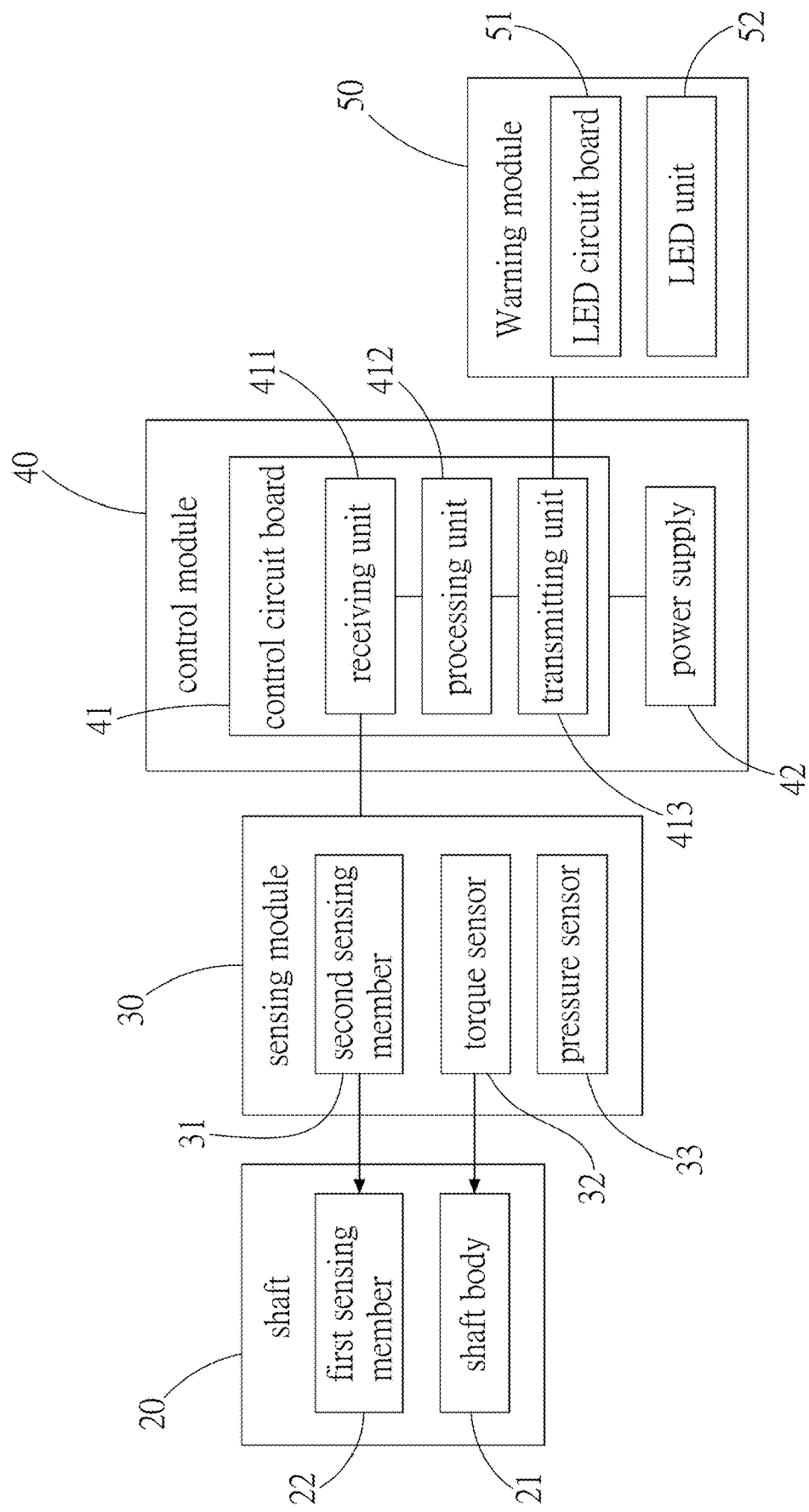
FIG. 5 is a block diagram of the first preferred embodiment of the present invention.

The shaft 20 is received in the seat body 11 of the base 10, passing through the first storage space 111 and the second storage space 112. The shaft 20 comprises a shaft body 21 and a first sensing member 22. An end of the shaft body 21 is connected to the valve stem, while another end protrudes outside the seat body 11 to connect to a driving device (not shown) so that the driving device is able to drive the shaft body 21, valve stem and the valve seat to rotate synchronously. The shaft body 21 has a torque sensing surface 210 located on the shaft body 21. Additionally, a fixing ring 211, an O-ring 212, and a sealing ring 213 is mounted on the shaft body 21 respectively. The fixing ring 211, in a C-shaped structure, is located within the first storage space 111; the O-ring 212 is located at the junction between the first storage space 111 and the second storage space 112; and the sealing ring 213 is located within the second storage space 112 to separate the second storage space 112 from the first storage space 111, thereby a sealed space is formed between the second storage space 112 and the stem packing of the valve body. The first sensing member 22 is engaged with the shaft body 21 and is received in the first storage space 111, rotating synchronously with the shaft body 21. It should be noted that a profile of a cross-section of the shaft 20 including the first sensing member 22 along least a radial direction is asymmetrical. Specifically, the shaft body 21 is cylindrical, and the first sensing member 22 includes of a ring-shaped sensing circuit board 220 and a metal layer 221. The sensing circuit board 220 is fixed around an outer peripheral surface of the shaft body 21 by the fixing ring 211 to rotate synchronously with the shaft body 21. The metal layer 221 covers at least a portion of the sensing circuit board 220, with an area smaller than that of the sensing circuit board 220, so that the metal layer 221 does not completely cover the sensing circuit board 220. When the cross-section of the shaft 20 including the first sensing member 22 is divided radially into two parts, an area of the metal layer 221 in one part differs from that in the other part, making the profile of the cross-section of the shaft 20 including the first sensing member 22 asymmetrical in the radial direction. For example, as shown in FIG. 4, when viewing the cross-section of the shaft 20 including the first sensing member 22, the area of the metal layer 221 is only half the area of the sensing circuit board 220. When viewing along the radial direction parallel to the two end boundaries of the metal layer 221, the area of the metal layer 221 in one part is 100% of the metal layer's area, while the area in the other part is 0%, resulting in a clear asymmetry in the profile of the cross-section of the shaft 20 including the first sensing member 22 in the radial direction. In an alternative preferred embodiment, the area covered by the metal layer on the sensing circuit board can be increased or decreased as needed, or changed to any other shape that makes the cross-section of the shaft asymmetrical.

The sensing module 30 comprises a second sensing member 31, a torque sensor 32, and a pressure sensor 33. The second sensing member 31 is fixed on the base 10 corresponded to the first sensing member 22 to sense changes in the position of the first sensing member 22, thereby generating a sensing signal. In the present preferred embodiment, the second sensing member 31 includes an inductive position sensor surrounding the outer peripheral surface of the shaft body 21 but not connected to the shaft body 21. The inductive position sensor is located on a side of the sensing circuit board 220 of the first sensing member 22 corresponding to the metal layer 221 and kept a predetermined distance from the sensing circuit board 220, and parallel to the sensing circuit board 220. An end of the inductive position sensor extends out from the first opening 111a of the seat body 11 and electrically connected to the control module 40. Additionally, the seat body 11 further includes a supporting seat 113 received in the first storage space 111, with an end engaged with a bottom surface of the first storage space 111 for supporting the inductive position sensor, the position of the metal layer 221 corresponding to the inductive position sensor changes when the metal layer 221 on the sensing circuit board 220 rotates with the shaft body 21, thereby altering the detected inductance, which can be converted into a voltage change through the circuit. The sensing signal is thus a voltage signal.

The torque sensor 32 is mounted on the torque sensing surface 210 of the shaft body 21 and electrically connected to the control module 40 to detect changes in torque of the shaft 21. In this embodiment, the torque sensing element 32 is a half-bridge strain gauge, generally rectangular in shape, adhered to the surface at a predetermined angle relative to an axial direction of the shaft body 21. As the shaft body 21 rotates, it generates a change in resistance, resulting in a resistance value signal. The predetermined angle typically ranges from 0 degree to 90 degrees, with a preferable angle of 45 degrees. In an alternative preferred embodiment, the torque sensing element may be a full-bridge strain gauge.

The pressure sensor 33 is mounted in the base 10, with an end electrically connected to the control module 40 and the other end extends into the second storage space 112 from the second opening 112a of the base 11. The pressure sensor 33 is configured to detect changes in pressure generated within the sealed space formed by the second storage space 112 and the stem packing, thereby generating a pressure value signal. In the present preferred embodiment, the pressure sensor 33 is a Microelectromechanical Systems Pressure Sensor (MEMS Pressure Sensor).

The control module 40 is received in the base 10 and comprises a control circuit board 41 and a power supply 42. The control circuit board 41 is received in the third storage space 13 of the base 10 and is electrically connected to the second sensing member 31, the torque sensor 32, and the pressure sensor 33. The control circuit board 41 includes a receiving unit 411, a processing unit 412, and a transmitting unit 413. The receiving unit 411 is configured to receive the sensing signal generated by the second sensing member 31, the resistance value signal generated by the torque sensor 32, and the pressure value signal generated by the pressure sensor 33. In the present preferred embodiment, the processing unit 412 calculates a rotation data of the shaft 20 based on voltage changes in the sensing signal, including but not limited to changes in angle, rotation speed, and rotating time due to rotation. The processing unit 412 also calculates the torque variation of the shaft 21 based on resistance value changes in the resistance value signal, and determines whether the stem packing is still in a sealed state based on pressure value changes in the pressure value signal. After the processing unit 412 completes the calculations, the processing unit 412 transmits this information via the transmitting unit 413 to the warning module 50 and/or an external remote device (such as a mobile phone, a computer, a tablet, a wearable device, or a network workstation for maintenance personnel), and controls the warning module 50 to operate when necessary. The transmitting unit 413 can transmit data and signals either in wired or wireless modes, with wireless transmission including but not limited to Bluetooth, infrared, Wi-Fi, LPWAN (Low-Power Wide-Area Network), RFID, and any other wireless methods. The power supply 42 is electrically connected to the control circuit board 41 and the warning module 50 to provide electric power to the control circuit board 41, the second sensing member 31, the torque sensor 32, the pressure sensor 33, and the warning module 50.

The warning module 50 is mounted the case 12 of the base 10 and signal connected to the control module 40 to emit a warning signal under control by the control module 40. In the present preferred embodiment, the warning module 50 includes at least one LED circuit board 51 received in the third storage space 13 of the base 10 and at least one LED unit 52 mounted on the outer surface of the case 12 and electrically connected to the LED circuit board 51. The LED unit 52 is able to emit the warning signal under the control of the LED circuit board 51. The warning signal includes a warning light corresponding to the rotation status, torque status, and pressure status of the valve.2, which can be continuous light, flashing light, or light changing color over time. In an alternative preferred embodiment, the LED unit can also receive and display relevant information calculated by the processing unit, including but not limited to the number of rotations, torque values, and pressure values. Therefore, maintenance personnel can determine whether maintenance or servicing is required by examining the warning signal displayed by the warning module 50 to assess the current rotation status, torque status, and pressure status of the valve 2. It should be noted that in an alternative preferred embodiment, the warning module may include a sound unit (such as a buzzer) where the warning signal includes an auditory signal; or a vibration unit where the warning signal includes a vibration signal; or any other equivalent device that can warn the maintenance personnel.

Figure 6:
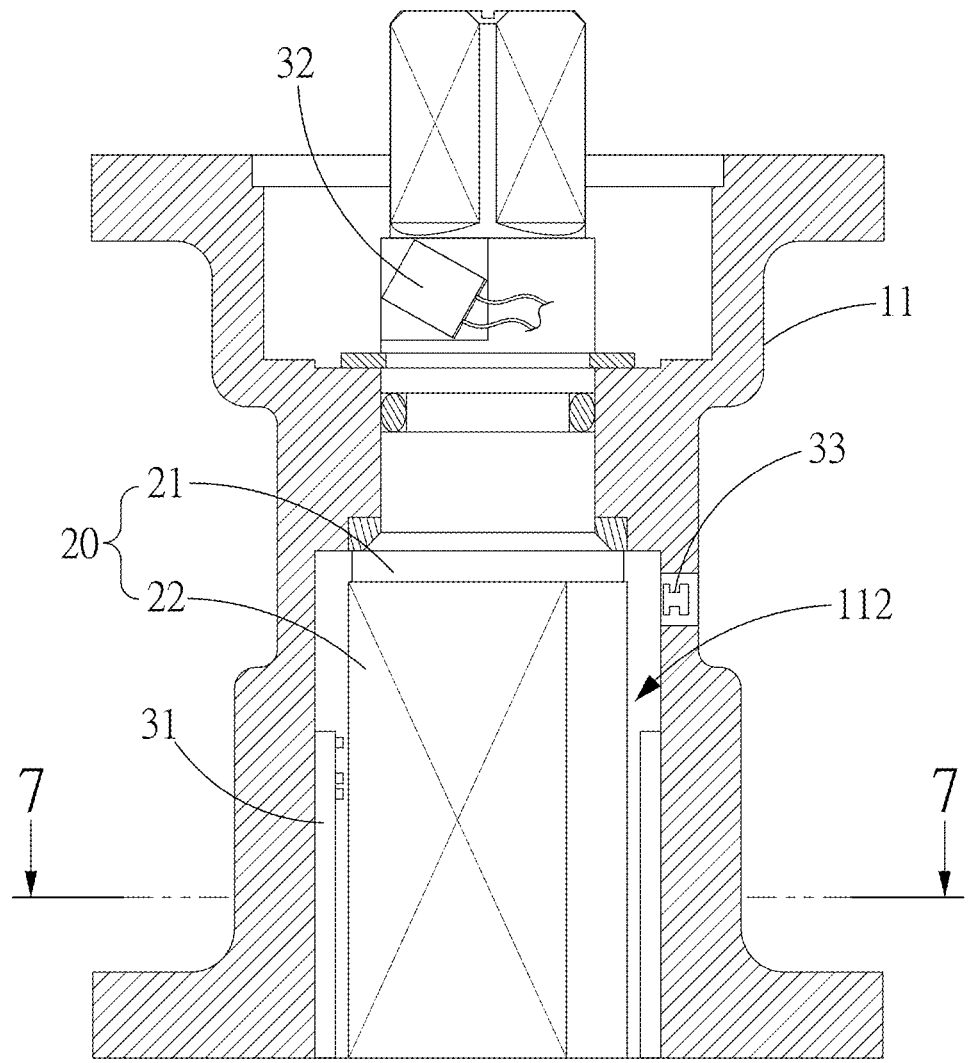
FIG. 6 is a portrait sectional view of a second preferred embodiment of the present invention.
Figure 7:
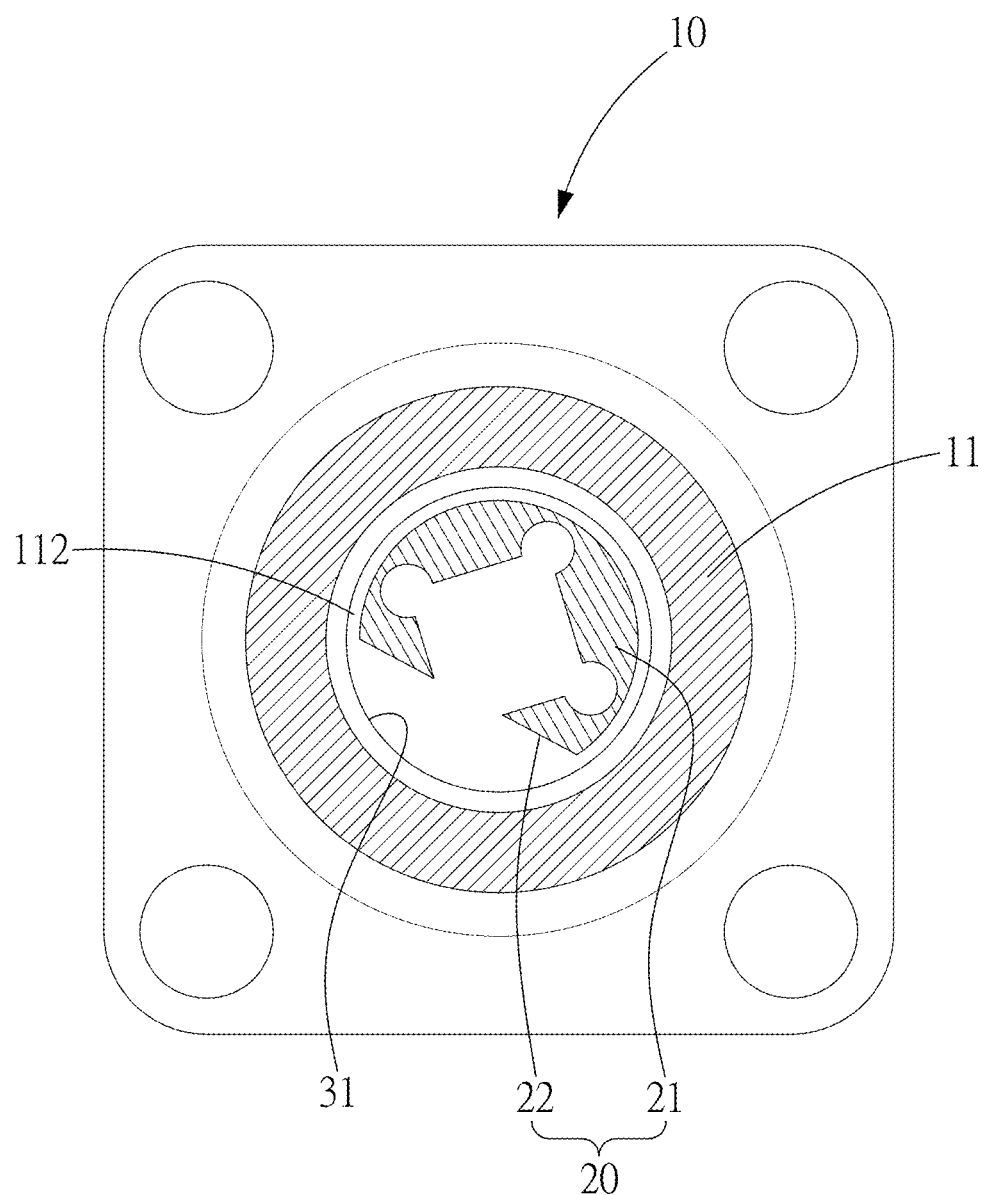
FIG. 7 is a lateral sectional view of the second preferred embodiment of the present invention, showing the profile of the cross-section of the shaft being passed through by the first sensing member.

As shown in FIG. 6 and FIG. 7, in the second preferred embodiment of the present invention, the structure is similar to that of the first preferred embodiment. In the present preferred embodiment, the shaft body 21 has a ring-shaped metal outer surface. The first sensing member 22 is a surface integrally formed on the shaft body 21 and extends inward along the radial direction of the shaft body 21, located in the second storage space 112 and rotates synchronously with the shaft body 21. A distance between the first sensing member 22 and the center of the shaft body 20 is between 0 and 0.167 R, where R is the radius of the shaft body 21 on a cross-section passing through the first sensing member 22. Thus, when the cross-section of the shaft 20 passing through the first sensing member 22 is divided into two parts along one radial direction, areas occupied by the two parts are different, resulting in an asymmetric profile of the cross-section of the shaft 20 along that radial direction. The second sensor 31 is a ring-shaped inductive position sensor attached to an inner surface of the second storage space 112 of the seat body 11, corresponding to the first sensing member 22 on the shaft body 21. The inductive position sensor keeps a predetermined distance to the shaft body 21 so that it does not rotate with the shaft body 21. Consequently, when the shaft body 21 rotates, the first sensing member 22 rotates synchronously. At least a distance between the first sensing member 22 and the second sensing member 31 is greater than a distance between the second sensor 31 and the outer surface of the shaft body 21 and the second sensing member 31. Therefore, the detected inductance from the second sensing member 31 changes accordingly, which is converted into a voltage value change by the circuit to calculate at least one of the number of rotations, angle changes, and rotational angular velocity of the shaft body 21.

Figure 8:
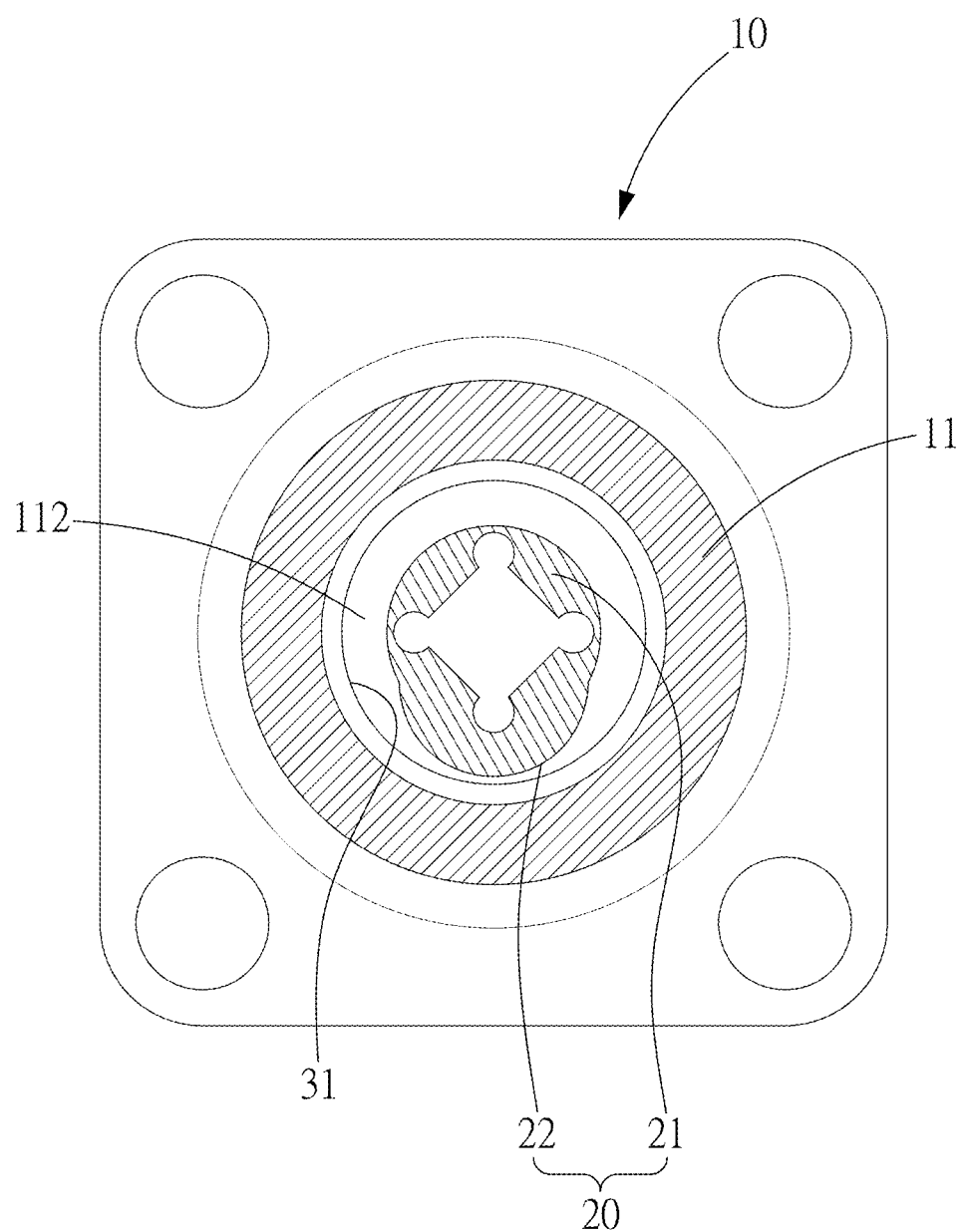
FIG. 8 is a lateral sectional view of a third preferred embodiment of the present invention, showing profile of the cross-section of the shaft being passed through by the first sensing member.

As shown in FIG. 8, in the third preferred embodiment of the present invention, the structure is similar to that of the second preferred embodiment. In the present preferred embodiment, the shaft body 21 has a ring-shaped metal outer surface. The first sensing member 22 is a surface integrally formed on the shaft body 21 and extends outward along the radial direction of the shaft body 21, located in the second storage space 112 and rotates synchronously with the shaft body 21. A distance between a farthest edge of the first sensing member 22 and the center of the shaft body 20 is greater than R, where R is the radius of the shaft body 21 on a cross-section passing through the first sensing member 22. Thus, when the cross-section of the shaft 20 passing through the first sensing member 22 is divided into two parts along a radial direction, areas occupied by the two parts are different, resulting in an asymmetric profile of the cross-section of the shaft 20 along that radial direction. The second sensor 31 is a ring-shaped inductive position sensor attached to an inner surface of the second storage space 112 of the seat body 11, corresponding to the first sensing member 22 on the shaft body 21. The inductive position sensor keeps a predetermined distance to the shaft body 21 so that it does not rotate with the shaft body 21. Consequently, when the shaft body 21 rotates, the first sensing member 22 rotates synchronously. At least a distance between the first sensing member 22 and the second sensing member 31 is less than a distance between the second sensor 31 and the outer surface of the shaft body 21 and the second sensing member 31. Therefore, the detected inductance from the second sensing member 31 changes accordingly, which is converted into a voltage value change by the circuit to calculate at least one of the number of rotations, angle changes, and rotational angular velocity of the shaft body 21.

In conclusion, the warning device for valve maintenance provided by the present invention uses the second sensing member 31 to sense the relative position of the first sensing member 22 due to the asymmetrical cross-sectional profile of the shaft 20, in addition to detect changes in the torsion angle of the valve stem and automatically determine the frequency of rotations of the valve, thereby predicting the service life of the valve to determine whether maintenance is needed. The torque sensor 32 can detect torque value to detect the operating status of the valve stem base on the changes in torque. The pressure sensor 33 can detect changes in pressure of the stem packing to detect whether the stem packing is sealed or unsealed. On the other hand, the present invention allows maintenance personnel to easily receive the relevant information of the valve 2 from outside through the warning module 50, and the warning module 50 may automatically warns the maintenance personnel when the valve 2 is in an abnormal state, so that the maintenance personnel can immediately respond to the problem of the valve 2, thereby effectively solves the problem of valve damage due to long-term use or excessive rotation.

It must be pointed out that the embodiments described above are only some preferred embodiments of the present invention. All equivalent structures which employ the concepts disclosed in this specification and the appended claims should fall within the scope of the present invention.

What is claimed is:

1. A warning device, mounted on a valve which including a valve body, a valve seat and a valve stem; the warning device comprising:
   a base connected to the valve body;
   a shaft having a shaft body and a first sensing member; the shaft body movably received in the base with an end connected to the valve stem to drive the valve stem to rotate; wherein a profile of a cross-section of the shaft being passed through by the first sensing member is asymmetric along at least a radial direction;
   a sensing module having a second sensing member received in the base and corresponded to the first sensing member to detect changes in position of the first sensing member and generate a sensing signal accordingly;
   a control module, received in the base and electrically connected to the sensing module, having a receiving unit and a processing unit; the receiving unit receiving the sensing signal generated by the sensing module; the processing unit calculating a rotation data based on the sensing signal; and
   a warning module received in the base and signal connected to the control module to generate a warning signal according to the rotation data from the processing unit;
   wherein the first sensing member includes a sensing circuit board and a metal layer; the sensing circuit board surrounds the shaft body, and the metal layer is mounted on the sensing circuit board covering at least a portion of the sensing circuit board; the second sensing member includes an inductive position sensor surrounding the shaft body and kept a predetermined distance to the metal layer.

2. The warning device of claim 1, wherein the cross-section the shaft being passed through by the first sensing member can be separated as two parts through the radial direction, and areas of the metal layer in each parts are different.

3. The warning device of claim 1, wherein the base has a first storage space and a first opening communicated with each other; the first sensing member and the second sensing member are received in the first storage space, and an end of the second sensing member extends out of the first storage space and electrically connected to the control module.

4. The warning device of claim 1, wherein the sensing module further includes a torque sensor mounted on the shaft body and electrically connected to the control module to detect changes in resistance as the shaft body rotates and generate a resistance value signal accordingly; the control module calculates a torque data based on the resistance value signal generated by the torque sensor.

5. The warning device of claim 4, wherein the shaft body includes a torque sensing surface on its outer periphery; the torque sensor is attached to the torque sensing surface and is tilted at a predetermined angle relative to an axial direction of the shaft body.

6. The warning device of claim 1, wherein the base includes a seat body and a case surrounding the seat body, and a third storage space is formed between the seat body and the case; the warning module includes a LED circuit board and a LED unit; the LED circuit board is received in the third storage space of the base and signal connected to the control module; the LED unit is mounted on an outer surface of the case and electrically connected to the LED circuit board to generate a warning light base on the control from the control module.

7. The warning device of claim 1, wherein the shaft body has a ring-shaped metal outer surface; the first sensing member includes a surface integrally formed on the outer surface of the shaft body and extending outward along the radial direction of the shaft body; the second sensing member includes an inductive position sensor corresponded to the first sensing member, surrounding the shaft body and kept a predetermined distance from the shaft body; at least a distance between the first sensing member and the second sensing member is less than a distance between the outer surface of the shaft body and the second sensing member.

8. A warning device, mounted on a valve which including a valve body, a valve seat and a valve stem; the warning device comprising:
 a base connected to the valve body;
 a shaft having a shaft body and a first sensing member; the shaft body movably received in the base with an end connected to the valve stem to drive the valve stem to rotate; wherein a profile of a cross-section of the shaft being passed through by the first sensing member is asymmetric along at least a radial direction;
 a sensing module having a second sensing member received in the base and corresponded to the first sensing member to detect changes in position of the first sensing member and generate a sensing signal accordingly;
 a control module, received in the base and electrically connected to the sensing module, having a receiving unit and a processing unit; the receiving unit receiving the sensing signal generated by the sensing module; the processing unit calculating a rotation data based on the sensing signal; and
 a warning module received in the base and signal connected to the control module to generate a warning signal according to the rotation data from the processing unit;
 wherein the base includes a second storage space and a second opening; the second storage space is connected to a stem packing of the valve body so that the valve stem extends into the second storage space through the stem packing; the sensing module further includes a pressure sensor electrically connected to the control module and extends into the second storage space through the second opening to detect changes in pressure of the second storage space and generate a pressure value signal accordingly; the control module calculates a pressure data based on the pressure value signal generated by the pressure sensor.

9. A warning device, mounted on a valve which including a valve body, a valve seat and a valve stem; the warning device comprising:
 a base connected to the valve body;
 a shaft having a shaft body and a first sensing member; the shaft body movably received in the base with an end connected to the valve stem to drive the valve stem to rotate; wherein a profile of a cross-section of the shaft being passed through by the first sensing member is asymmetric along at least a radial direction;
 a sensing module having a second sensing member received in the base and corresponded to the first sensing member to detect changes in position of the first sensing member and generate a sensing signal accordingly;
 a control module, received in the base and electrically connected to the sensing module, having a receiving unit and a processing unit; the receiving unit receiving the sensing signal generated by the sensing module; the processing unit calculating a rotation data based on the sensing signal; and
 a warning module received in the base and signal connected to the control module to generate a warning signal according to the rotation data from the processing unit;
 wherein the shaft body has a ring-shaped metal outer surface; the first sensing member includes a surface integrally formed on the outer surface of the shaft body and extending inward along the radial direction of the shaft body; the second sensing member includes an inductive position sensor corresponded to the first sensing member, surrounding the shaft body and kept a predetermined distance from the shaft body; at least a distance between the first sensing member and the second sensing member is greater than a distance between the outer surface of the shaft body and the second sensing member.

* * * * *